United States Patent [19]

Cobb et al.

[11] Patent Number: 4,759,219

[45] Date of Patent: Jul. 26, 1988

[54] SWING PARAMETER MEASUREMENT SYSTEM

[75] Inventors: Robert A. Cobb; Charles E. Tarr, both of Orono, Me.

[73] Assignee: Swingspeed, Inc., Orono, Me.

[21] Appl. No.: 50,757

[22] Filed: May 15, 1987

[51] Int. Cl.⁴ .......................... G01P 1/02; A63B 69/40
[52] U.S. Cl. .................................... 73/493; 73/517 R; 273/26 R; 273/186 R
[58] Field of Search ............................. 73/517 R, 493; 273/26 R, 26 B, 26 C, 186; 324/162, 60 CD, 62; 377/23

[56] References Cited

U.S. PATENT DOCUMENTS

| | | | |
|---|---|---|---|
| 3,788,149 | 1/1974 | Wilner | 73/517 R |
| 3,884,085 | 5/1975 | Beckman et al. | 73/517 R |
| 4,429,271 | 1/1984 | Doubek et al. | 324/60 CD |
| 4,492,916 | 1/1985 | Johnson | 324/60 CD |

OTHER PUBLICATIONS

Berlin, Howard M., *555 Timer Applications Sourcebook with Experiments*, 1976, pp. 104, 110–111.
"A Measure of the Man", Sports Illustrated, vol. 28, No. 17, Apr. 29, 1968, pp. 11–12.

Primary Examiner—Stewart J. Levy
Assistant Examiner—Robert P. Bell
Attorney, Agent, or Firm—Daniel H. Kane, Jr.

[57] ABSTRACT

A transistor logic device uses a signal from a transducer responsive to the centrifugal force experienced in or near the strike zone of a baseball bat during the swing to digitally process and numerically display numerals representative of the maximum centrifugal force experienced during the swing. Knowledge of the maximum force during the swing is useful on a comparative basis in improving batting performance and the speed of the swing can be computed or the displayed numbers can be converted into numbers revealing swing speed in miles per hour or other units. The use of digital data, dealt with digitally, and displayed digitally simplifies, and reduces the cost and size of the apparatus to allow it to be integrated within an actual baseball bat.

6 Claims, 2 Drawing Sheets

SWING PARAMETER MEASUREMENT SYSTEM

BACKGROUND

A number of sports depend upon skillful swinging of a bat, stick, club, racket, or other implement to drive a ball or other object. Perfection of the needed skill requires development of reproducible physical characteristics of the swing. The swing characteristics of path, speed, and power must be optimized and regularized to achieve a reliable, competitive athletic performance level. Training benefits from the ability to discern which factors require improvement, to what extent, and whether or not improvement is being accomplished. The ability to measure parameters related to the several factors of the swing characteristics provides the ability to gauge comparative improvement in relative terms as well as the ability to establish norms or goals in absolute terms.

Bringing a cylindrical bat into proper contact with a baseball traveling along an unpredictable path at speeds approaching 90 miles per hour requires a remarkable combination of eye, body, and mind coordination. The manifold factors of stance, grip, the motions of arms, legs, feet, head, and torso, and ball path estimation all are essential elements of the swing. They contribute in cumulative fashion to the result of a good hit.

The speed of the swing of the bat is determinative of two important variables; (1) the force imparted to the ball, and (2) the time available to the batter to decide whether or not to swing. An increase in swing speed desirably increases both variables. Assuming that other factors are fixed, a higher swing speed will result in a higher hit ball speed. A higher swing speed allows the swing to be initiated later in time, thereby increasing the time for decision.

It should be noted that for a baseball bat swing, it is desirable to minimize the time elapsed between the start (decision to swing) and ball contact, thereby desirably delaying the point in time at which the decision to swing is made. This is in contrast to other sports, such as golf, where the ball is stationary and the need to decide whether or not to swing is absent. In golf, the sector of the swing arch which requires the maximum velocity is that just prior to impact. The time elapsed between the start of the swing of the club and ball contact is, therefore, less important than in baseball.

In the past, swing speed was largely a matter of subjective opinion or feel. The inability conveniently to measure swing speed made it difficult to judge whether or not a refinement or modification in a batter's technique consistently resulted in a higher swing speed. While the desirability of some kind of measurement was appreciated, the means suggested have been cumbersome, applicable only to simulated clubs or bats, delayed in presentation until long after the event, or more theoretical than practical.

The present invention is concerned with the practical acquisition, processing, and presentation of data related to the speed of swing of an athletic implement such as a baseball bat actually used to hit balls and the method and apparatus for doing so.

BRIEF DESCRIPTION OF THE INVENTION

In accordance with the present invention a numerical display related to the maximum swing speed is provided which is available immediately upon the swing of the bat. A transducer to provide data related to swing speed, a data processor, a digital display, and enabling circuitry are incorporated within the body of a baseball bat or other sports implement. Transistor-Transistor Logic (TTL) is employed wherein the information is digital (pulse counts), is dealt with digitally, and is displayed digitally. The digital treatment employed helps to minimize the size and cost of the device and to provide a unit small enough to be suitable for embedding within the physical confines of a baseball bat.

According to the present invention, the variable sensed and utilized is the maximum centrifugal force experienced by the transducer during the swing of the bat. While, in the context of the somewhat different problem of a golf club swing, an accelerometer has been suggested to be used to provide a signal related to linear acceleration experienced at the club head and that signal elsewhere integrated electrically to provide a signal related to linear velocity (See Evans U.S. Pat. No. 3,270,564 for example), the result is an approximation based upon hidden assumptions and delayed long in time. A far more accurate measure of the batter's performance is provided by direct sensing of centrifugal force. The maximum force which the batter delivers to the bat is the parameter most revealing of the performance of the batter.

While the measure of centrifugal force is the most meaningful parameter, the units of the measure are not units familiar to most batters. Rather than deal with actual force units, the invention contemplates display of a digit pair which represents, in unitless relative terms, the maximum force experienced by the transducer during the swing.

The digital output may be converted into, and displayed in the familiar units of speed in miles per hour. The maximum centrifugal force can be converted by computation into terms of swing speed using assumed dimensions for a normal batter's swing radius, or more accurately can be computed for a particular batter by utilizing a program containing factors descriptive of the dimensions of the particular batter's swing radius. These factors easily can be approximated closely by knowing only the height of the batter, the grip to strike zone distance, and the size of the bat.

The centrifugal force is sensed by a spring biased potentiometer actuated by a mass moved outwardly by the force. The force sensing potentiometer can be a conventional analog potentiometer device, or can be a discrete step (commutator) device in which a slider sequentially establishes communication with a series of discrete spots, as for example a multi-pole sliding switch.

A constant rate first clock provides pulses to a binary coded decimal (BCD) counter. A variable rate second clock having a variable frequency of pulses determined by the output signal of the force sensing potentiometer is connected to a gate at the input of counters which ultimately provide an output to a digital display which reflects the relative maximum force of the swing. Additional circuitry eliminates readings below a preselected threshold minimum, captures and selects the maximum value for the purpose of display, may convert the force equivalent digital information into velocity units for display and resets the device.

THE DRAWINGS

DETAILED DESCRIPTION OF THE INVENTION

According to the present invention, the speed of a batter's swing is ascertained, processed and displayed by transistor logic and display circuitry integral with an actual baseball bat. The speed of the swing is measured by utilizing a variable resistance having a magnitude dependent upon the centrifugal force experienced by the bat in or near the strike zone of the bat. A transducer comprising a spring biased mass and a potentiometer having a resistance value related to the displacement of the spring biased mass is employed to provide the input variable to the logic circuitry. The centrifugal force experienced is the most significant parameter of the batter's swing performance which readily can be measured. That force is convertible into the more easily understood units of miles per hour by knowing or assuming constants related to the batter's physique.

In the transducer employed in the present invention, the centrifugal force ($F_c$) acts upon a restoration spring associated with the potentiometer in the bat to provide a displacement (x) to change the potentiometer resistance in relation to the displacement.

$$F_c = kx$$

Centrifugal force is determined by:

$$F_c = \frac{mv^2}{r} = m\omega^2 r$$

In the subject environment, the mass (m) acting against the transducer spring and the radius to the transducer (r) are constants in the centrifugal force equation. Linear velocity (v) and angular velocity () are variables. Simplifying by eliminating constants:

$$F_c \approx v^2 \approx \omega^2$$

The actual linear speed of the bat at the radius of the transducer can be calculated using:

$$v = \sqrt{\frac{rF_c}{m}} \text{ or } v = r\omega, \text{ where } \omega = \sqrt{\frac{F_c}{mv}}$$

Figure 1:
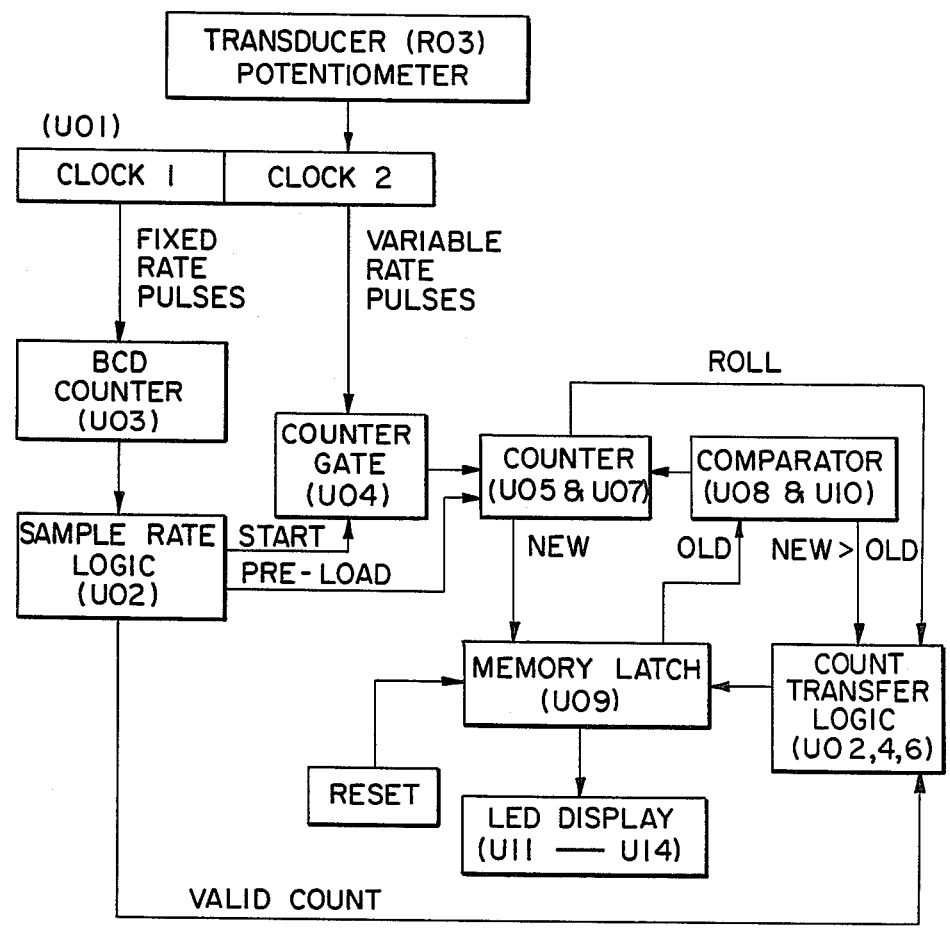
FIG. 1 is a logic block diagram showing the basic units of the data processing aspects of the invention.

Turning now to FIG. 1, operation of the device is illustrated with reference to a logic block diagram.

CLOCK 1 is an oscillator having an output of pulses at a predetermined, fixed frequency. The output pulses are processed in the BCD COUNTER, a binary to decimal (BCD) converting counter the output of which is input to a SAMPLE RATE LOGIC device which produces signals used in conjunction with other circuitry to produce control signals.

A second clock oscillator (CLOCK 2) produces clock pulses at a variable rate which depends upon the variable resistance of the TRANSDUCER POTENTIOMETER of the centrifugal force measuring transducer in the baseball bat. The pulse from CLOCK 2 are input to a COUNTER GATE. When a control signal from the SAMPLE RATE LOGIC device is received at the other input of the COUNTER GATE, the pulses from CLOCK 2 are input to COUNTER, a cascaded pair of decimal counters which are provided with a pre-loaded count of 75 by an output of the SAMPLE RATE LOGIC device. When enabled, the COUNTER counts CLOCK 2 pulses in excess of 75. If, during the sample period, CLOCK 2 yields a sufficient count, the COUNTER will exceed 99 and overflow, thus producing a ROLL signal.

If a ROLL signal occurs during a valid sampling period, a VALID COUNT signal is produced which sets a flip-flop in the COUNT TRANSFER LOGIC device to enable the possibility of updating the DISPLAY.

A MEMORY LATCH device retains the previous highest count for display by the LED DISPLAY device. The COMPARATOR compares the latest count with the stored count, and, only if the latest count is higher, the new count is transferred to the MEMORY LATCH device to replace the prior count.

The LED DISPLAY may be a conventional light emitting diode device (LED) or a liquid crystal display (LCD) to produce a numeric decimal display of the count retained by the MEMORY LATCH device. To conserve power, the LED DISPLAY is stroboscopically pulsed. A RESET device clears the MEMORY LATCH device whenever a reset signal is received.

The entire apparatus or device easily is formed on a small printed circuit board using Transistor Transistor Logic (TTL) integrated circuits of the 74LS (low power Schottky) family. The assembly can be encapsulated in resin such as a silicone elastomer and implanted in a relatively small bore or excavation in a baseball bat. A small battery is required for circuit and display power and may be replaceable or rechargeable.

DESCRIPTION OF A PREFERRED EMBODIMENT

Figure 2:
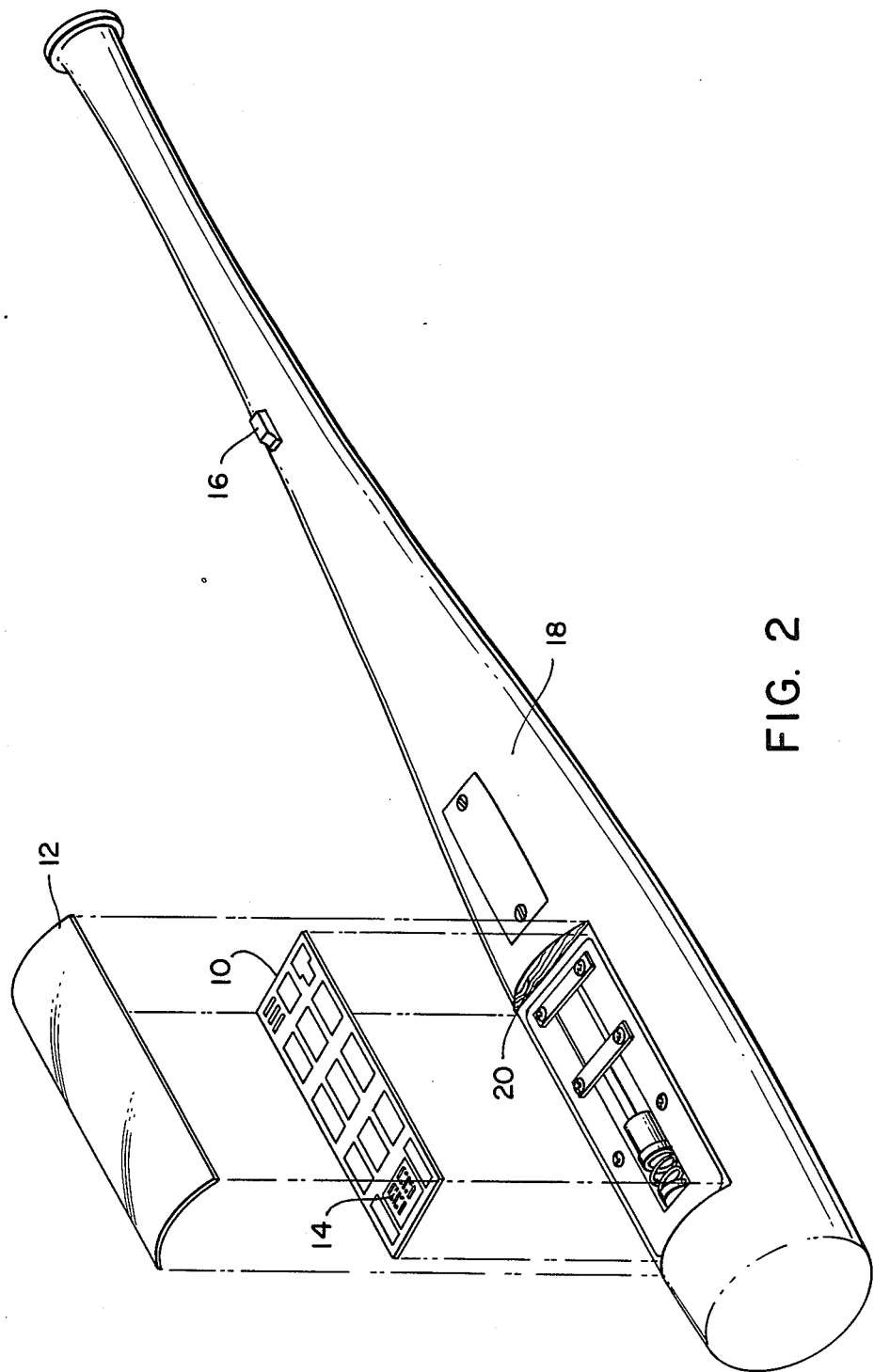
FIG. 2 is a view perspective of the apparatus of the present invention as installed in a baseball bat.

FIG. 2 illustrates a conventional wooden baseball bat having the device of the present invention integrated with it by excavation of a suitably shaped cavity 20 into which the device 10 is embedded. A cover plate 12 restores the exterior shape of the bat. A digital decimal display 14 provides the numerical value related to the measured swing. A switch 16 enables the circuit and a battery 18 powers it and the display 14.

Referring again to FIG. 1, the invention is shown as a logic block diagram.

CLOCK 1 and CLOCK 2 are halves of a dual pulse generating oscillator (U01) such as a 556 device. The CLOCK 1 oscillator section is provided with conventional external enabling circuitry including a trimpot for fine adjustment of clock frequency. The other half of the dual oscillator is used for CLOCK 2. The external enabling circuitry for CLOCK 2 includes the variable resistance of a force transducer, the TRANSDUCER POTENTIOMETER (R03), a ¼ watt 10K Ω potentiometer. The variable resistance is used in an RC circuit to vary the frequency of pulses from CLOCK 2 in relation to the resistance of the TRANSDUCER POTENTIOMETER (R03), which resistance is representative of the displacement by centrifugal force experienced by the associated mass as the bat is swung. A suitable potentiometer is Maurey Instrument Corporation Number M 1326-1-103, 10K Ω.

The constant frequency pulses from CLOCK 1 are converted from binary to decimal in a BCD COUNTER (U03) such as a 74LS190 device. The four binary signal outputs representative of decimals 0-9 are directed to a SAMPLE RATE LOGIC device (U02)

which comprises three of the four NOR gate portions of a 74LS02 device.

One signal output of the SAMPLE RATE LOGIC device is one input to the COUNTER GATE (U04) which comprises one NAND gate portion of a 74LS00. The function is to provide signals indicative of a fixed interval of a specific number of pulses, conveniently ten pulses. The other signal input to the COUNTER GATE is the pulses (variable in rate) from CLOCK 2. The output of the COUNTER GATE, when enabled during the fixed interval, is the train of pulses of CLOCK 2 during a valid count interval. These signal pulses are counted in the COUNTER. The COUNTER is a cascaded pair (U05 and U07) of 74LS190 decimal counters arranged to count up to decimal 99 and, upon the next pulse, then to overflow or roll over to output a ROLL signal. The COUNTER is preloaded with decimal 75 by the SAMPLE RATE LOGIC device to prevent counting below the threshold of 75. This avoids useless counting. The count signal representing the present count is directed to the COMPARATOR (U08 and U10) and to the MEMORY LATCH. The ROLL signal is directed to a COUNT TRANSFER LOGIC device (U02, U04, U06).

The COMPARATOR device comprises a pair of 74LS85 devices (U08 for the most significant digit and U10 for the least significant digit) for each of the two digits of the LED DISPLAY. The pair of devices in the COMPARATOR are connected to compare the prior count information stored in the MEMORY LATCH (which information represents the decimal numerals displayed at the LED DISPLAY) with the present or current count information from the COUNTER. If the current count is a valid count (meaning a count great enough to cause a ROLL signal), and if the current count is numerically greater than the count information stored in the MEMORY LATCH (the prior count), then the current count information is directed to the COUNT TRANSFER LOGIC device.

The COUNT TRANSFER LOGIC device is a combination of one NOR gate of a 74LS02 (U02); one NAND gate of a 74LS00 (U04); and a flip-flop of a 74LS85 (U-6). The function of the COUNT TRANSFER LOGIC device is to receive an enabling signal from the SAMPLE RATE LOGIC device once for every tens count cycle of the BCD to establish each counting interval; a signal from the counter representing the present or current count if a valid count (a count with a ROLL signal); and an enabling signal from the COMPARATOR if the current count is greater than the prior count stored in the MEMORY LATCH. If all conditions are met, then the COUNT TRANSFER LOGIC device transfers the new count to the MEMORY LATCH to replace (update) the count stored in the MEMORY LATCH and thereby the digits displayed by the LED DISPLAY. The LED DISPLAY comprises a pair of octal LED display panels (U12 and U13) and a pair of digital to octal drivers (U11 and U14) which are 74LS47 devices. The decimal numerals displayed by the LED DISPLAY is related to, but not necessarily numerically identical with, the count. A reset clears the memory latch.

In operation, every BCD count cycle (10 pulses of CLOCK 1) starts a sampling period or fixed interval for pulses from CLOCK 2. As the bat swing occurs, numerous sampling periods of CLOCK 2 pulses occur sequentially. The pulse rate of CLOCK 2 depends upon the centrifugal force experimented at the TRANSDUCER POTENTIOMETER. The count of CLOCK 2 pulses in each fixed interval or sample period is compared with the prior count of the previous sample period and, if greater, is forwarded to the octal drivers to update the decimal numerals displayed by the LED DISPLAY. Uselessly low counts are ignored.

The unitless digits of the decimal numerical display can be converted into bat speed by looking up the displayed number in a table such as TABLE I, below, suitable for the particular batter.

The radius (r) is the batter's swing radius which can be provided from a table conveniently based upon the observation that a person's arm reach is related to standing height. An exemplary table is provided below for a batter 70 inches tall:

TABLE I

| DIGITAL READING | (Batter Height 70 inches) Bat Speed (mph) Grip to Ball distance (inches) | | | | | |
|---|---|---|---|---|---|---|
| | 16 | 18 | 20 | 22 | 24 | 26 |
| 5 | 27.4 | 28.0 | 28.5 | 29.1 | 29.6 | 30.1 |
| 10 | 30.4 | 31.0 | 3107 | 32.2 | 32.8 | 33.4 |
| 15 | 33.5 | 34.1 | 34.8 | 35.5 | 36.1 | 36.7 |
| 20 | 36.5 | 37.3 | 38.0 | 38.7 | 39.4 | 40.1 |
| 25 | 39.6 | 40.4 | 41.1 | 41.9 | 42.7 | 43.4 |
| 30 | 42.6 | 43.4 | 44.3 | 45.1 | 45.9 | 46.7 |
| 35 | 45.6 | 46.5 | 47.4 | 48.3 | 49.2 | 50.0 |
| 40 | 48.6 | 49.6 | 50.5 | 51.5 | 52.4 | 53.3 |
| 45 | 51.5 | 52.6 | 53.6 | 54.6 | 55.6 | 56.6 |
| 50 | 54.5 | 55.6 | 56.6 | 57.7 | 58.7 | 59.8 |
| 55 | 57.3 | 58.5 | 59.6 | 60.7 | 61.8 | 62.0 |
| 60 | 60.2 | 61.4 | 62.6 | 63.7 | 64.9 | 66.0 |
| 65 | 62.9 | 64.2 | 65.5 | 66.7 | 67.9 | 69.1 |
| 70 | 65.7 | 67.0 | 68.3 | 69.6 | 70.8 | 72.1 |
| 75 | 68.4 | 69.8 | 71.1 | 72.4 | 73.8 | 75.0 |
| 80 | 71.0 | 72.5 | 73.9 | 75.2 | 76.6 | 77.9 |
| 85 | 73.6 | 75.1 | 76.6 | 78.0 | 79.4 | 80.8 |
| 90 | 76.2 | 77.7 | 79.2 | 80.7 | 82.1 | 83.6 |
| 95 | 78.7 | 80.2 | 81.8 | 83.3 | 84.8 | 86.3 |
| 100 | 81.1 | 82.7 | 84.3 | 85.9 | 87.5 | 89.0 |

We claim:

1. An athletic implement having mounted thereon apparatus to measure and display a parameter related to the swing of the athletic implement, the apparatus comprising:

a variable resistance force transducer to measure the centrifugal force experienced at the transducer in terms of resistance, means to convert the resistance into a rate of pulses, means to count the pulses during a fixed interval, to provide a present count, means to compare the present count with the prior count of the previous interval to determine which is greater, and numerical display means to display decimal numerals reflective of the greater of the prior or the present count, whereby said decimal numerals indicate a value related to the measured swing parameter.

2. An athletic implement having mounted thereon apparatus to measure and display a parameter related to the swing of the athletic implement, the apparatus comprising:

a variable resistance force transducer to measure the centrifugal force experienced at the transducer in terms of resistance, a first pulse generating oscillator having a fixed pulse rate, a binary to decimal counter device having output signals representing a count of a cycle of ten pulses of the first oscillator, a second pulse generating oscillator having a pulse rate determined by the variable resistance of the force transducer, a control gate having as an input the variable rate pulses of the second oscillator, and as an enabling input the output signal of the binary to decimal counter device, and, while enabled, an output of the pulses of the second oscillator, a counter device for receiving the output of the control gate, while enabled, to count the pulses of the second oscillator, a memory device for storing the count provided by the counter device, a comparator device for comparing the most recent count of the counter device with the count stored in the memory device, and only if greater, transferring the most recent count to replace the count stored in the memory device with the greater, more recent count, and numerical display means to display decimal numerals related to the count presently stored in the memory device, whereby said decimal numerals indicate a value related to the measured swing parameter.

3. The apparatus of claim 2 wherein counter device is a cascaded pair of decimal counters which generate a signal upon reaching a total count in excess of decimal 99.

4. The apparatus of claim 3 wherein the counter device is pre-loaded with a count to permit disregard of counts less than the pre-load.

5. The apparatus of claim 4 wherein the most recent count is transferred only when the signal reflecting a total count in excess of 99 has issued.

6. The method of measuring a parameter of the swing of an athletic implement comprising the steps of: swinging the athletic implement employing a variable resistance force transducer mounted on the athletic implement to measure the centrifugal force experienced at the transducer in terms of resistance.

utilizing that resistance to vary the rate of pulses generated by a first oscillator, establishing a plurality of sequential, identical fixed intervals by means of a second oscillator having a fixed pulse rate, counting the pulses of the first oscillator during a fixed interval to establish a present count, comparing the present count with any previous count retained in a memory device, replacing the count retained in the memory device with the present count, only if the present count is larger, and using a numerical display, displaying decimal numbers related to the new count.

* * * * *